(12) United States Patent
Mente

(10) Patent No.: US 8,486,523 B2
(45) Date of Patent: Jul. 16, 2013

(54) LIGNOCELLULOSIC PRODUCTS AND METHODS OF FORMING THE SAME

(75) Inventor: Donald Charles Mente, Grosse Ile, MI (US)

(73) Assignee: BASF SE, Ludwigshafen (DE)

( * ) Notice: Subject to any disclaimer, the term of this patent is extended or adjusted under 35 U.S.C. 154(b) by 185 days.

(21) Appl. No.: 13/055,825

(22) PCT Filed: Jul. 13, 2009

(86) PCT No.: PCT/EP2009/058884
§ 371 (c)(1),
(2), (4) Date: Apr. 4, 2011

(87) PCT Pub. No.: WO2010/009992
PCT Pub. Date: Jan. 28, 2010

(65) Prior Publication Data
US 2011/0189473 A1 Aug. 4, 2011

Related U.S. Application Data

(60) Provisional application No. 61/083,794, filed on Jul. 25, 2008.

(51) Int. Cl.
*B32B 23/04* (2006.01)

(52) U.S. Cl.
USPC ........... 428/323; 428/532; 428/533; 428/534; 428/535; 428/536; 264/109; 156/331.7

(58) Field of Classification Search
USPC ......... 428/323, 532–536; 264/109; 156/331.7
See application file for complete search history.

(56) References Cited

U.S. PATENT DOCUMENTS

| | | | |
|---|---|---|---|
| 4,193,832 A * | 3/1980 | Reischl et al. ............. | 156/331.7 |
| 4,522,976 A | 6/1985 | Grace et al. | |
| 4,742,113 A | 5/1988 | Gismond et al. | |
| 5,093,412 A | 3/1992 | Mente et al. | |
| 5,179,131 A | 1/1993 | Wujcik et al. | |
| 5,223,570 A | 6/1993 | Huang et al. | |
| 5,425,976 A | 6/1995 | Clarke et al. | |
| 5,594,066 A | 1/1997 | Heinemann et al. | |
| 5,814,699 A | 9/1998 | Kratz et al. | |
| 6,034,146 A | 3/2000 | Falke et al. | |
| 6,103,140 A | 8/2000 | Falke et al. | |
| 6,297,313 B1 | 10/2001 | Hsu | |
| 6,344,165 B1 | 2/2002 | Coleman | |
| 6,352,658 B1 | 3/2002 | Chang et al. | |
| 6,352,661 B1 | 3/2002 | Thompson et al. | |
| 6,432,543 B2 | 8/2002 | Harrison et al. | |
| 6,451,101 B1 | 9/2002 | Mente et al. | |
| 6,458,238 B1 | 10/2002 | Mente et al. | |
| 6,464,820 B2 | 10/2002 | Mente et al. | |
| 6,472,447 B1 | 10/2002 | Lorenz et al. | |
| 6,638,459 B2 * | 10/2003 | Mente et al. .................. | 264/125 |
| 6,649,098 B2 * | 11/2003 | Mente et al. .................. | 264/109 |
| 6,649,107 B2 | 11/2003 | Harrison et al. | |
| 6,822,042 B2 | 11/2004 | Capps | |
| 6,846,849 B2 | 1/2005 | Capps | |
| 7,179,882 B2 | 2/2007 | Adkins et al. | |
| 7,439,280 B2 * | 10/2008 | Lu et al. ........................ | 523/122 |
| 2002/0117260 A1 * | 8/2002 | Meckel ...................... | 156/331.7 |
| 2003/0047278 A1 | 3/2003 | Mente et al. | |
| 2005/0221078 A1 | 10/2005 | Lu et al. | |
| 2005/0242459 A1 | 11/2005 | Savino et al. | |
| 2006/0157183 A1 | 7/2006 | Evers et al. | |

OTHER PUBLICATIONS

Technical Bulletin, Structural Board Association, "Binders and Waxes in OSB", accessed on Oct. 7, 2011 from website: http://osbguide.tecotested.com/pdfs/en/tb114.pdf, 1 page.
Wu et al, "Thickness Swelling and It's Relationship to Internal Bond Strength Loss of Commercial Oriented Strandboard", 1999, vol. 49, No. 7/8, pp. 50-55.
Slideshow Presentation, "Wood 474, Structural Panels", accessed on Feb. 27, 2008 from website: http://courses.forestry.ubc.ca/Defaultaspx?alias=courses.forestry.ubc.ca/wood474, 7 pages.
D. Randall and S. Lee, "The Polyurethanes Book," 2002, Huntsman International LLC, United Kingdom, pp. 397-399.
International Search Report for Application No. PCT/EP2009/058884 dated Oct. 9, 2009, 4 pages.

* cited by examiner

*Primary Examiner* — Leszek Kiliman
(74) *Attorney, Agent, or Firm* — Howard & Howard Attorneys PLLC

(57) ABSTRACT

A lignocellulosic product comprises a plurality of lignocellulosic pieces, and an isocyanate component and a processing aid disposed on the pieces. The processing aid is reactive with the isocyanate component, comprises a graft polyol having a continuous and discontinuous phase, and can be used to form a lignocellulosic composite article. The processing aid is useful for imparting the composite article with moisture resistance, swelling resistance, and toughness, as well as providing cold-tack during manufacture of the composite article from the product. The continuous phase comprises an isocyanate-reactive component. The discontinuous phase comprises polymeric particles. The isocyanate component and the processing aid are present in the product a combined amount of from about (1) to about (25) parts by weight based on (100) parts by weight of the product. The composite article can be various engineered lignocellulosic composites, such as oriented strand board (OSB), particleboard (PB), scrimber, or fiberboard.

25 Claims, No Drawings

LIGNOCELLULOSIC PRODUCTS AND METHODS OF FORMING THE SAME

RELATED APPLICATIONS

This application claims priority to and all the advantages of International Patent Application No. PCT/EP2009/058884, filed on Jul. 13, 2009, which claims priority to U.S. Provisional Patent Application No. 61/083,794, filed on Jul. 25, 2008.

FIELD OF THE INVENTION

The present invention generally relates to lignocellulosic products specifically, the present invention relates to lignocellulosic products comprising a plurality of lignocellulosic pieces, an isocyanate component, and a processing aid, to lignocellulosic composites articles formed from the lignocellulosic products, and to methods of forming the lignocellulosic products and lignocellulosic composite articles.

DESCRIPTION OF THE RELATED ART

Lignocellulosic composite articles, such as oriented strand board (OSB), oriented strand lumber (OSL), particleboard (PB), scrimber, agrifiber board, chipboard, flakeboard, and fiberboard, e.g. medium density fiberboard (MDF), are generally produced by blending or spraying lignocellulosic pieces with a binder composition, e.g. a resin, while the lignocellulosic pieces are tumbled or agitated in a blender or similar apparatus. After blending sufficiently to form a binder-lignocellulosic mixture, the lignocellulosic pieces, which are now coated with the binder composition, are formed into a product, specifically a loose mat, which is compressed between heated platens/plates to set the binder composition and to bond the lignocellulosic pieces together in densified form, such as in a board, panel, or other shape. Conventional processes for compressing the loose mat are generally carried out at temperatures of from about 120° C. to about 225° C., in the presence of varying amounts of steam, either purposefully injected into the loose mat or generated by liberation of entrained moisture from the lignocellulosic pieces in the loose mat. These processes also generally require that the moisture content of the lignocellulosic pieces be between about 2% and about 20% by weight, before blending the lignocellulosic pieces with the binder composition.

The lignocellulosic pieces can be in the form of chips, shavings, strands, scrim, wafers, fibers, sawdust, bagasse, straw and wood wool. When the lignocellulosic pieces are relatively larger in size, e.g. from 1 to 7 inches, the lignocellulosic composite articles produced by the process are known in the art under the general term of engineered wood. These engineered woods include laminated strand lumber, OSB, OSL, scrimber, parallel strand lumber, and laminated veneer lumber. When the lignocellulosic pieces are relatively smaller, e.g. typical sawdust and refined fiber sizes, the lignocellulosic composite articles are known in the art as particleboard and fiberboard, e.g. MDF. Other engineered woods, such as plywood, employ larger sheets of lumber, which are held together by a binder composition in a sandwich configuration. Yet other engineered woods, such as scrimber, employ thin, long, irregular pieces of wood having average diameters ranging from about 2 to 10 mm and lengths several feet in length.

The engineered woods were developed because of the increasing scarcity of suitably sized tree trunks for cutting lumber. Such engineered woods can have advantageous physical properties such as strength and stability. Another advantage of the engineered woods is that they can be made from the waste material generated by processing other wood and lignocellulosic materials. This leads to efficiencies and energy savings from the recycling process, and saves landfill space.

Binder compositions that have been used for making such lignocellulosic composite articles include phenol formaldehyde (PF) resins, urea formaldehyde (UF) resins and isocyanate resins. Binder compositions based on isocyanate chemistry are commercially desirable because they have low water absorption, high adhesive and cohesive strength, flexibility in formulation, versatility with respect to cure temperature and rate, excellent structural properties, the ability to bond with lignocellulosic materials having high water contents, and importantly, zero formaldehyde emissions. Some disadvantages of isocyanates are difficulty in processing due to adhesion to platens, lack of cold-tack (i.e., the isocyanates are not "tacky" or "sticky"), cost, and the need for special storage in certain scenarios.

It is known to treat lignocellulosic materials with polymethylene poly(phenyl isocyanates) (also known in the art as polymeric MDI or PMDI) to improve the strength of the composite article. Typically, such treatment involves applying the isocyanate to the lignocellulosic material and allowing the isocyanate to cure, either by application of heat and pressure or at room temperature. While it is possible to allow the PMDI to cure under ambient conditions, residual isocyanate (NCO) groups remain on the treated articles for weeks or even months in some instances. It is also known, but generally less acceptable from an environmental standpoint, to utilize toluene diisocyanate (TDI), for such purposes. Isocyanate prepolymers are among the preferred isocyanate materials that have been used in binder compositions to solve various processing problems, particularly, in reducing adhesion to press platens and for reducing reactivity of the isocyanates.

Traditionally, various "sizing" agents, such as waxes, have been added to the lignocellulosic composite articles with the aim of achieving water repellency and to lower swelling of the lignocellulosic composite articles when exposed to moisture. The wax, such as paraffin (which can be a melt or an emulsified suspension), is added to the lignocellulosic composite article during manufacture. The wax fills micro-cracks present in the lignocellulosic composite article, thus achieving at least some water repellency and reduction of swelling of the lignocellulosic composite article via physical obstruction of the cracks, which reduces uptake of water.

Unfortunately, the wax is essentially inert to the other components employed in the lignocellulosic composite article, such as the isocyanate, i.e., the wax does not react with other components employed in the lignocellulosic composite article. Therefore, the wax does not assist in increasing, for example, internal bond (IB) strength of the lignocellulosic composite article, and in fact, can reduce such strength. Similarly, wax does not assist in keeping the lignocellulosic composite article together prior to applying pressure and heat, i.e., while in the loose mat form, product, a mass, or a "furnish" form, as understood in the art. For example, press closing speed must be reduced when employing isocyanates and wax relative to using PF or UF resins and wax, because air entrained in the loose mat can damage structure of the loose mat if the press is closed too quickly. This problem is predominantly due to lack of tackiness of the isocyanate (and wax, if employed), while PF and UF resins do provide a degree of tackiness on their own. Decreasing the rate of press closure is detrimental to manufacturers of such lignocellulosic composite articles for economic reasons such as reduced throughput and increased labor costs.

In addition, during manufacture of the lignocellulosic composite article, high temperatures encountered during manufacture, such as those described above, e.g. during pressing or during steam injection, cause sublimation and/or evaporation of the wax from the lignocellulosic composite article. This loss of wax from the lignocellulosic composite article can cause many problems. For example, the build-up of wax can pose a potential fire hazard, with wax building-up and depositing on equipment surfaces. Wax derived vapors can also contribute to the generation of a hydrocarbon haze in a manufacturing facility. In addition, manufacturing costs increase, not only from the physical loss of the wax from the lignocellulosic composite article, e.g. upwards of 50% by weight, but also from clean-up, safety, and housekeeping costs of maintaining a manufacturing apparatus and surrounding area used for making the lignocellulosic composite articles.

Accordingly, there remains an opportunity to provide lignocellulosic composite articles with improved moisture resistance, improved swelling resistance, reduced manufacturing cost, improved cold-tack, and improved toughness. There also remains an opportunity to provide a method of forming such lignocellulosic composite articles. For example, there remains an opportunity to address a long felt need of increasing pressing speed during manufacture of lignocellulosic composite articles that employ isocyanates for binder compositions, and optionally, waxes. As another example, there remains an opportunity to address economic concerns due to the use of wax in forming certain lignocellulosic composite articles.

SUMMARY OF THE INVENTION AND ADVANTAGES

A lignocellulosic product comprises a plurality of lignocellulosic pieces. The lignocellulosic product further comprises an isocyanate component disposed on the plurality of lignocellulosic pieces. The lignocellulosic product yet further comprises a processing aid. The processing aid is reactive with the isocyanate component, comprises a graft polyol having a continuous phase and a discontinuous phase. The continuous phase comprises an isocyanate-reactive component. The discontinuous phase comprises polymeric particles. The isocyanate component and the processing aid are present in the lignocellulosic product in a combined amount of from about 1 to about 25 parts by weight based on 100 parts by weight of the lignocellulosic product. Methods of foaming the lignocellulosic product are also disclosed.

The lignocellulosic product of the present invention has excellent cold-tack, and can be used to form a variety of lignocellulosic composite articles. Lignocellulosic composite articles formed from the lignocellulosic product of the present invention have excellent moisture resistance, reduction in swelling, and increased toughness and resilience relative to conventional lignocellulosic composite articles. The processing aid is reactive with the isocyanate component, which provides for excellent physical properties of the lignocellulosic product and the lignocellulosic composite articles formed therefrom. The processing aid also provides increased cold-tack, which, in part, reduces manufacturing costs and increases robustness of the methods of the present invention. The methods of the present invention provides for reduced manufacturing costs, such as providing for increased pressing speeds during manufacture of the lignocellulosic composite articles, and provides the lignocellulosic products and lignocellulosic composite articles of the present invention with the aforementioned advantages, such as increased moisture resistance.

DETAILED DESCRIPTION OF THE INVENTION

The present invention provides a lignocellulosic product. The lignocellulosic product can be used to form various forms of lignocellulosic composite articles. The lignocellulosic product, hereinafter the product, will be further described below. The present invention also provides a lignocellulosic composite article. The lignocellulosic composite article, hereinafter the composite article, can be used for various applications. Examples of such applications include, but are not limited to, for packaging; for furniture and cabinetry; for roof and floor sheathing; for roof, floor, and siding paneling; for window and door frames; and for webstock, e.g. webstock for engineered I-beams. The composite article, in various embodiments, can be referred to as various forms of engineered lignocellulosic composites, e.g., as engineered wood composites, such as oriented strand board (OSB); oriented strand lumber (OSL); scrimber; fiberboard, such as low density fiberboard (LDF), medium density fiberboard (MDF), and high density fiberboard (HDF); chipboard; flakeboard; particleboard (PB); plywood; etc. Generally, the composite article is in the form OSB, OSL, PB, scrimber, plywood, LDF, MDF, or HDF; however, it is to be appreciated that lignocellulosic composite article may be in other engineered wood forms, such as, but not limited to, those described and exemplified herein.

Both the product and the composite article of the present invention comprise a plurality of lignocellulosic pieces. The lignocellulosic pieces can be derived from a variety of lignocellulosic materials. Generally, the lignocellulosic pieces are derived from wood; however, the lignocellulosic pieces can be derived from other lignocellulosic materials, such as from bagasse, straw, flax residue, nut shells, cereal grain hulls, etc., and mixtures thereof. If wood is employed as the lignocellulosic material, the lignocellulosic pieces can be prepared from various species of hardwoods and/or softwoods, as understood in the art. Non-lignocellulosic materials in flake, fibrous or other particulate form, such as glass fiber, mica, asbestos, rubber, plastics, etc., can also be mixed with the lignocellulosic material; however, such materials are not generally required for purposes of the present invention.

The lignocellulosic pieces can come from a variety of processes, such as by comminuting small logs, industrial wood residue, branches, rough pulpwood, etc. into pieces in the form of sawdust, chips, flakes, wafer, strands, scrim, fibers, sheets, etc. In certain embodiments, the lignocellulosic pieces comprise those pieces typically employed for forming OSB, OSL, scrimber, and particleboards. In other embodiments, the lignocellulosic pieces comprise those pieces typically employed for forming fiberboards, such as LDF, MDF, and HDF. In yet another embodiment the lignocellulosic pieces comprise those pieces typically employed for forming plywood. It is to be appreciated that the product and composite article of the present invention can include various combinations of the aforementioned materials and/or pieces, such as strands and sawdust. In addition, the composite article may be formed (from the product) into other shapes other than panels and boards.

As introduced above, the lignocellulosic pieces can be produced by various conventional techniques. For example, pulpwood grade logs can be converted into flakes in one operation with a conventional roundwood flaker. Alternatively, logs and logging residue can be cut into fingerlings on the order of from about 0.5 to about 3.5 inches long with a conventional apparatus, and the fingerlings flaked in a conventional ring type flaker. As understood in the art, the logs are typically debarked before flaking. It is to be appreciated that the present invention is not limited to any particular method of forming the lignocellulosic pieces.

The dimensions of the lignocellulosic pieces are not particularly critical for purposes of the present invention. In certain embodiments, such as those used to foi in OSB, the lignocellulosic pieces typically comprise strands having an average length of from about 2.5 to about 6 inches, an average width of from about 0.5 to about 2 inches, and an average thickness of from about 0.1 to about 0.5 inches. It is to be appreciated that other sizes can also be employed, as desired by one skilled in the art. In some of these embodiments, the product and composite article may include other types of lignocellulosic pieces, such as chips, in addition to the strands. In certain embodiments, strands which are typically about 1.5 inches wide and about 12 inches long can be used to make laminated strand lumber, while strands typically about 0.12 inches wide and about 9.8 inches long can be used to make parallel strand lumber. In certain embodiments, such as those used to form flakeboard, the lignocellulosic pieces comprise flakes having an average length of from about 2 to about 6 inches, an average width of about 0.25 to about 3 inches, and an average thickness of from about 0.005 to about 0.05 inches. In other embodiments, such as those used to from scrimber, the lignocellulosic pieces comprise thin, irregular pieces having average diameters ranging from about 0.25 to about 20, more typically from about 0.5 to about 15, and most typically from about 1 to about 10, mm, and lengths ranging from several inches to several feet in length. Detailed information on suitable sizes and shapes of lignocellulosic pieces, e.g., scrim, as well as methods of manufacturing scrimber, for purposes of the present invention, is described in U.S. Pat. No. 6,344,165 to Coleman, the disclosure of which is incorporated herein by reference in its entirety. The lignocellulosic pieces can be further milled prior to use, if such is desired to produce a size more suitable for producing a desired article. For example, hammer, wing beater, and toothed disk mills may be used for forming lignocellulosic pieces of various sizes and shapes.

The lignocellulosic pieces can have various moisture contents. Typically, the lignocellulosic pieces have a moisture content of from about 1 to about 20, more typically from about 2 to about 15, yet more typically from about 3 to about 12, and most typically from about 3 to about 10, parts by weight (water), based on 100 parts by weight of the lignocellulosic pieces. If present in (or on) the lignocellulosic pieces, the water assists in the curing or setting of the product to form the composite article, as understood by those skilled in the art. It is to be appreciated that the lignocellulosic pieces can have inherent moisture content; or alternatively, water may be added to or removed from the lignocellulosic pieces, such as by wetting or drying the lignocellulosic pieces, respectively, to obtain a desired moisture content of the lignocellulosic pieces prior to and/or during formation of the composite article.

The lignocellulosic pieces are present in the product and composite article in various amounts, depending on the type of composite article desired to be formed from the product. Typically, such as in OSB, PB, scrimber, or MDF applications, the lignocellulosic pieces are present in an amount of from about 75 to about 99, more typically from about 85 to about 98, yet more typically from about 90 to about 97, and most typically about 92 to about 96, parts by weight, based on 100 parts by weight of the product or the composite article.

The product and composite article further comprises an isocyanate component disposed on the plurality of lignocellulosic pieces. By "disposed on", it is meant that the isocyanate component is in contact with at least a portion of the lignocellulosic pieces. As used herein, and for convenience of description only, a reaction product or a binder composition may be referenced. Specifically, the reaction product comprises the reaction product of the isocyanate component and a processing aid reactive with the isocyanate component (the processing aid is described further below). As such, the reaction product is present in the composite article, and the reaction product binds the lignocellulosic pieces together. The binder composition comprises the isocyanate component and at least one or more other components, e.g. the processing aid, once all of the components are part of the composite article, as further described below. Generally, the binder composition is only present for some amount of time prior to the reaction product curing to a final cured state to form the composite article. In other words, the reaction product is the final cured state of the binder composition, after reaction occurs between the components included therein, i.e. after reaction between the isocyanate component and the processing aid. Such components of the binder composition can be premixed or combined to form the binder composition and then the binder composition can be applied to the lignocellulosic pieces. More typically, the isocyanate component and the other component(s) are individually applied to the lignocellulosic pieces during formation of the composite article, rather then premixed and applied, all of which is further described below. As understood to those skilled in the art, the isocyanate component adheres the lignocellulosic pieces together, once cured. Further, the reaction product, which includes both the isocyanate component and processing aid, also bonds the lignocellulosic pieces together. General mechanisms of adhesion, for wood composites, are detailed in pages 397 through 399 of THE POLYURETHANES HANDBOOK (David Randall & Steve Lee eds., John Wiley & Sons, Ltd. 2002).

The isocyanate component is typically a polyisocyanate having two or more functional groups, e.g. two or more isocyanate (NCO) groups. Suitable organic polyisocyanates, for purposes of the present invention include, but are not limited to, conventional aliphatic, cycloaliphatic, araliphatic and aromatic isocyanates. In certain embodiments, the isocyanate component is selected from the group of diphenylmethane diisocyanates (MDIs), polymeric diphenylmethane diisocyanates (PMDIs), and combinations thereof. Polymeric diphenylmethane diisocyanates are also referred to in the art as polymethylene polyphenylene polyisocyanates. In other embodiments, the isocyanate component is an emulsifiable MDI (eMDI). Examples of other suitable isocyanates, for purposes of the present invention include, but are not limited to, toluene diisocyanates (TDIs), hexamethylene diisocyanates (HDIs), isophorone diisocyanates (IPDIs), naphthalene diisocyanates (NDIs), and combinations thereof.

In certain embodiments, the isocyanate component is an isocyanate-terminated prepolymer. The isocyanate-terminated prepolymer is a reaction product of an isocyanate and a polyol and/or a polyamine. The isocyanate may be any type of isocyanate known to those skilled in the polyurethane art, such as one of the polyisocyanates described above. If employed to make the isocyanate-terminated prepolymer, the polyol is typically selected from the group of ethylene glycol, diethylene glycol, propylene glycol, dipropylene glycol, butane diol, glycerol, trimethylolpropane, triethanolamine, pentaerythritol, sorbitol, and combinations thereof. If employed to make the isocyanate-terminated prepolymer, the polyamine is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof. It is to be appreciated that the isocyanate-terminated prepolymer may be formed from a combination of two or more of the aforementioned polyols and/or polyamines.

As alluded to above, the isocyanates or isocyanate-terminated prepolymers may also be used in the form of an aqueous emulsion by mixing such materials with water in the presence of an emulsifying agent. The isocyanate component may also be a modified isocyanate, such as, carbodiimides, allophanates, isocyanurates, and biurets.

Other suitable isocyanates, for purposes of the present invention, include those described in U.S. Pat. Nos. 4,742,113 to Gismondi et al.; 5,093,412 to Mente et al.; 5,425,976 to Clarke et al.; 6,297,313 to Hsu; 6,352,661 to Thompson et al.; 6,451,101 to Mente et al.; 6,458,238 to Mente et al.; 6,464,820 to Mente et al.; 6,638,459 to Mente et al.; 6,649,098 to Mente et al.; 6,822,042 to Capps; and 6,846,849 to Capps; and U.S. Publication Nos. 2003/0047278 to Mente et al.; 2005/0221078 to Lu et al.; 2005/0242459 to Savino et al.; and 2006/0157183 to Evers et al.; the disclosures of which are incorporated herein by reference in their entirety.

Specific examples of suitable isocyanate components, for purposes of the present invention, are commercially available from BASF Corporation of Florham Park, N.J., under the trademark LUPRANATE®, such as LUPRANATE® M, LUPRANATE® MI, LUPRANATE® M20SB, LUPRANATE® M20HB, and LUPRANATE® M20FB isocyanates. It is to be appreciated that the isocyanate component may include any combination of the aforementioned isocyanates and/or isocyanate-terminated prepolymers.

The isocyanate component typically has a viscosity which is suitable for specific applications of the isocyanate component to the lignocellulosic pieces, such as by spraying, fogging and/or atomizing the isocyanate component to apply the isocyanate component to the lignocellulosic pieces. Typically, the isocyanate component has a viscosity of from about 100 to about 5,000, more typically from about 100 to about 2,500, and most typically from about 100 to about 1,000, cps at 25° C. according to ASTM D2196. Regardless of the application technique, the viscosity of the isocyanate component should be sufficient to adequately coat the lignocellulosic pieces.

Typically, such as in OSB, PB, scrimber, or MDF applications, the isocyanate component is present in an amount of from about 1 to about 20, more typically from about 1 to about 15, and most typically about 2 to about 10, parts by weight, based on 100 parts by weight of the reaction product or the binder composition. Generally, when too little of the isocyanate component is employed, the resulting composite article does not have the necessary physical properties to be commercially successful. Likewise, when too much of the isocyanate component is employed, cost of manufacturing the composite article generally increases beyond any imparted benefits of employing such amounts of the isocyanate component.

The composite article further comprises the processing aid disposed on the plurality of lignocellulosic pieces, as first introduced above. By "disposed on", it is meant that the processing aid is in contact with at least a portion of the lignocellulosic pieces. As such, the binder composition further comprises the processing aid. The processing aid is reactive with the isocyanate component. As such, the processing aid can also be referred to as an "isocyanate-reactive processing aid". The processing aid comprises a graft polyol. In certain embodiments, the processing aid may also comprise other components including a supplemental polyol and/or other standard urethane resin components. In another embodiment, the processing aid consists of the graft polyol.

In one embodiment, the graft polyol is a polymer polyol. In other embodiments, the graft polyol is selected from the group of polyhamstoff (PHD) polyols, polyisocyanate polyaddition (PIPA) polyols, and combinations thereof. It is to be appreciated that the processing aid can comprise any combination of the aforementioned graft polyols. Graft polyols may also be referred to in the art as graft dispersion polyols or graft polymer polyols. Graft polyols are well known to those skilled in the polyurethane art and include products, i.e., polymeric particles, obtained by the in-situ polymerization of one or more vinyl monomers, e.g. styrene monomers and/or acrylonitrile monomers, and a macromer in a polyol, e.g. a polyether polyol. In one embodiment, the processing aid is a styrene-acrylonitrile graft polyol. PHD polyols are typically formed by in-situ reaction of a diisocyanate with a diamine in a polyol to give a stable dispersion of polyurea particles. PIPA polyols are similar to PHD polyols, except that the dispersion is typically formed by in-situ reaction of a diisocyanate with an alkanoamine instead of a diamine, to give a polyurethane dispersion in a polyol. It is to be appreciated that the present invention is not limited to any particular method of making the graft polyol.

The processing aid serves as a sizing agent substitute, e.g. a sizing wax or wax sizing agent substitute, specifically by imparting a certain degree of water repellency to the composite article, once formed. Paraffin, for example, is a common wax sizing agent for OSB and OSL applications. In certain embodiments, the lignocellulosic product and composite article is substantially free of a wax component, such as paraffin. By "substantially free", it is meant that in these embodiments, the wax component is typically present in an amount no greater than about 5, more typically no greater than about 2.5, yet more typically no greater than about 1.5, and most typically approaching or equaling 0, parts by weight, based on 100 parts by weight of the product or the composite article. In certain embodiments, the product and the composite article are completely free of a wax component.

One method by which the processing aid of the present invention imparts water repellency is by at least partially coating a surface of the lignocellulosic pieces, thus decreasing surface tension of the surface. Another method by which the processing aid imparts water epellency is that the processing aid at least partially fills capillaries within and between the lignocellulosic pieces, thus providing a barrier to capillary uptake of water. Further, it is believed that the processing aid reduces formation of micro- and/or nano-cracks from forming within the composite article, for example, within the binder composition, during or after cure to form the reaction product. Yet further, if such cracks are already present in the lignocellulosic pieces, the processing aid at least partially fills such cracks, as alluded to above with description of the capillaries. It is believed that the blocking of water and filling of cracks reduces de-lamination and swelling problems when the composite article is exposed to moisture during use. It is further believed that such "filling" largely occurs due to the polymeric particles of the graft polyol.

The processing aid comprises a continuous phase and a discontinuous phase, more typically the graft polyol includes the continuous phase and the discontinuous phase. The continuous phase of the processing aid is not generally miscible with the isocyanate component, which provides for increased coverage of the polymeric particles with reactive groups, such as hydroxyl (OH) groups. Such reactive groups can further impart crosslinking in the product and the composite article, once the reactive groups are reacted. The polymeric particles are further described below. The continuous phase comprises an isocyanate-reactive component for imparting the reactivity of the processing aid with the isocyanate component. In certain embodiments, as alluded to above, both the continuous phase and the discontinuous phase are reactive with the isocyanate component. These embodiments are described in greater detail below.

Typically, the isocyanate-reactive component of the processing aid comprises a polyol. The polyol is generally the polyol employed for forming the graft polyol, which can be referred to in the art as a carrier polyol; however, a distinct polyol separate from the polymeric particles may also be employed. The polyol generally has at least two hydroxyl groups reactive with the isocyanate component. The polyol may be the same as or different than the polyol previously described and exemplified above with description of the isocyanate-terminated prepolymer. The isocyanate-reactive component can comprise a polyester polyol, a polyether polyol, and combinations thereof. Further, the polyol can be selected from the group of, but is not limited to, aliphatic polyols, cycloaliphatic polyols, aromatic polyols, heterocyclic polyols, and combinations thereof. More specific examples of suitable polyols are selected from the group of, but are not limited to, glycerols, propylene glycols, sucrose-initiated polyols, sucrose/glycerine-initiated polyols, trimethylolpropane-initiated polyols, and combinations thereof.

In certain embodiments, the polyol is a hydrophobic polyol. In a specific embodiment, the polyol is a hydrophobic polyether polyol. In another specific embodiment, the polyol is a hydrophobic polyester polyol. The hydrophobic polyol contains alkylene oxides. In these embodiments, the hydrophobic polyol typically has from about 0 to about 50, more typically from about 2 to about 20, and most typically from about 5 to about 15, parts by weight of ethylene oxide (EO), based on 100 parts by weight of the alkylene oxides of the hydrophobic polyol. In other embodiments, the hydrophobic polyol typically has at least 60, more typically at least 70, and most typically at least 80, parts by weight propylene oxide (PO), based on 100 parts by weight of the alkylene oxides. Accordingly, in these embodiments, the hydrophobic polyol is a propylene oxide rich polyol, which imparts the hydrophobic polyol with hydrophobicity, and therefore further imparts the product and the composite article with hydrophobicity.

In certain embodiments, the alkylene oxides of the hydrophobic polyol comprise a mixture of ethylene oxide and propylene oxide. In another embodiment, the alkylene oxides of the hydrophobic polyol include only propylene oxide, i.e., the hydrophobic polyol does not include other alkylene oxides, such as ethylene oxide. In certain embodiments, the hydrophobic polyol comprises other types of alkylene oxides known in the art, e.g. butylene oxide (BO), in combination with propylene oxide, and optionally, in combination with ethylene oxide. The alkylene oxides of the hydrophobic polyol may be arranged in various configurations, such as a random (heteric) configuration, a block configuration, a capped configuration, or a combination thereof. For example, in one embodiment, the hydrophobic polyol comprises a heteric mixture of ethylene oxide and propylene oxide.

In certain embodiments, the hydrophobic polyol is terminally capped with ethylene oxide. The hydrophobic polyol typically has a terminal cap of from about 5 to about 25, more typically from about 5 to about 20, and most typically from about 10 to about 15, parts by weight ethylene oxide, based on 100 parts by weight of the hydrophobic polyol. It is to be appreciated that in certain embodiments, the ethylene oxide may only be present in the terminal ethylene oxide cap; however, in other embodiments, the ethylene oxide may also be present along with the propylene oxide, and optionally, with other alkylene oxides, e.g. butylene oxide, in the alkylene oxides of the hydrophobic polyol. Generally, for purposes of the present invention, increased propylene oxide content of the hydrophobic polyol is preferred in order to impart increased hydrophobicity to the product and the composite article.

Suitable hydrophobic polyols, for purposes of the present invention include, but are not limited to, glycerine-initiated, trimethylolpropane-initiated, propylene glycol-initiated, and sucrose-initiated polyether polyols, and combinations thereof. In one embodiment, the hydrophobic polyol is a glycerine-initiated polyether polyol. The alkylene oxides of the hydrophobic polyol generally extend from the respective initiator portion of the hydrophobic polyol.

As alluded to above, the discontinuous phase of the processing aid comprises polymeric particles. As introduced above, if micro- and/or nano-cracks are present in the lignocellulosic pieces, it is believed that the polymeric particles of the discontinuous phase of the processing aid at least partially fill these cracks. The polymeric particles are generally large in size due to their macromer constituents, i.e., the polymeric particles have micrometer or larger dimensions, e.g. micrometer or larger diameters. In certain embodiments, the polymeric particles have average diameters ranging from about 0.1 to about 10 microns, more typically from about 0.1 to about 1.5 microns. In other embodiments, the polymeric particles have average diameters less than 0.1 microns, which imparts the processing aid with nano-polymeric particles. Blocking of water and filling of cracks reduces de-lamination and swelling problems when the composite article is exposed to moisture during storage or use. In addition to filling cracks, in certain embodiments, the polymeric particles are reactive with the isocyanate component, which may increase internal bond (IB) strength of the composite article formed from the product. As introduced above, the polymeric particles typically comprise the reaction product of monomers selected from the group of styrenes, e.g. alpha-methyl styrene, acrylonitriles, esters of acrylic and methacrylic acids, ethylenically unsaturated nitriles, amines, amides, and combinations thereof. In certain embodiments, the polymeric particles comprise the further reaction of a macromer, such as a polyol having an unsaturation, which permits chemical incorporation of the polymeric particle, as described above. In these embodiments, it is believed that the polymeric particles can impart crosslinking in the composite article, due to reactive groups attached to the polymeric particles, e.g. OH groups, which can react with the isocyanate component. It is also believed that the polymeric particles can serve as a "hot melt" adhesive depending on their specific chemical makeup, e.g. polymeric particles formed from styrene and acrylonitrile monomers.

In one embodiment, the polymeric particles comprise styrene acrylonitrile (SAN) copolymers, which are the reaction product of styrene monomers and acrylonitrile monomers, as understood in the art. Typically, the SAN copolymers have a weight ratio of styrene to acrylonitrile of from about 30:70 to about 70:30, more typically about 40:60 to about 60:40, yet more typically from about 45:55 to about 60:40, most typically about 50:50 to about 60:40, and yet most typically from about 55:45 to about 60:40. In one embodiment, the SAN copolymers have a weight ratio of styrene to acrylonitrile of about 66.7:33.3. In another embodiment, the polymeric particles are urea, which are the reaction product of an amine monomer and an isocyanate (NCO) group, such as an NCO group of a diisocyanate. In yet another embodiment, the polymeric particles are urethane, which are the reaction product of an alcohol monomer and an isocyanate (NCO) group, such as an NCO group of a diisocyanate.

Typically, the polymeric particles are present in the processing aid in an amount of from about 5 to about 70, more typically from about 15 to about 55, and most typically from about 25 to about 50, parts by weight, based on 100 parts by weight of the processing aid. In one embodiment, the polymeric particles are present in the processing aid in an amount of about 65 parts by weight based on 100 parts by weight of the processing aid. Generally, increasing the amount of polymeric particles increases the water repellency of the product and the composite article, as like described above.

The graft polyol typically has a molecular weight of from about 400 to about 20,000, more typically from about 500 to about 10,000, yet more typically from about 600 to about 5,000, and most typically from about 700 to about 3,000. In one embodiment, the graft polyol has a molecular weight of about 730. In another embodiment, the graft polyol has a molecular weight of about 3,000.

Other suitable graft polyols and methods of making the same, for purposes of the present invention, include those described in U.S. Pat. Nos. 4,522,976 to Grace et al.; 5,093,412 to Mente et al.; 5,179,131 to Wujcik et al.; 5,223,570 to Huang et al.; 5,594,066 to Heinemann et al.; 5,814,699 to Kratz et al.; 6,034,146 to Falke et al.; 6,103,140 to Falke et al.; 6,352,658 to Chang et al.; 6,432,543 to Harrison et al.; 6,472,447 to Lorenz et al.; 6,649,107 to Harrison et al.; and 7,179,882 to Adkins et al., the disclosures of which are incorporated herein by reference in their entirety.

Specific examples of suitable graft polyols, for purposes of the present invention, are commercially available from BASF Corporation of Florham Park, N.J., under the trademark PLURACOL®, such as PLURACOL® 1365, PLURACOL® 4600, PLURACOL® 4650, PLURACOL® 4800, PLURACOL® 4815, PLURACOL® 4830, and PLURACOL® 4850 graft polyols. It is to be appreciated that the processing aid may include any combination of the aforementioned graft polyols. Detailed information on graft polyols is described on pages 104 and 105 of THE POLYURETHANES HANDBOOK (David Randall & Steve Lee eds., John Wiley & Sons, Ltd. 2002), which are incorporated herein in their entirety.

The processing aid typically has a viscosity which is suitable for specific applications of the processing aid to the lignocellulosic pieces, such as by spraying, fogging and/or atomizing the processing aid to apply the processing aid to the lignocellulosic pieces. Typically, the processing aid has a viscosity of from about 100 to about 10,000, more typically from about 500 to about 5,000, and most typically from about 500 to about 3,000, cps at 25° C. according to ASTM D2196. Regardless of application technique, the viscosity of the processing aid should be sufficient to adequately coat the lignocellulosic pieces.

Typically, the processing aid is present in an amount of from about 5 to about 40, more typically from about 10 to about 30, and most typically from about 15 to about 25, parts by weight, based on 100 parts by weight of the reaction product or the binder composition. It is to be appreciated that the processing aid may include any combination of the aforementioned polyols, polymeric particles, and/or graft polyols.

As alluded to above, the product and the composite article may further comprise an auxiliary polyol, different than the polyol employed as (or in) the processing aid. As such, the binder composition may further comprise the auxiliary polyol. Suitable polyols for use as the auxiliary polyol are as described and exemplified above with description of the isocyanate-terminated prepolymer. The auxiliary polyol can be used for various purposes. For example, an auxiliary polyol having a higher functionality (relative to the polyol of the graft polyol) can be employed to provide additional reactive groups for reaction with the isocyanate component, or an auxiliary polyol can be employed to increase or decrease viscosity of the processing aid. If employed, the auxiliary polyol may be employed in various amounts.

Both the product and the composite article may further comprise an additive component. As such, the binder composition and the reaction product formed therefrom may further comprise the additive component. If employed, the additive component is typically selected from the group of parting agents, catalysts, fillers, flame retardants, water, plasticizers, stabilizers, cross-linking agents, chain-extending agents, chain-terminating agents, air releasing agents, wetting agents, surface modifiers, foam stabilizing agents, moisture scavengers, desiccants, viscosity reducers, reinforcing agents, dyes, pigments, colorants, anti-oxidants, compatibility agents, ultraviolet light stabilizers, thixotropic agents, anti-aging agents, lubricants, coupling agents, solvents, rheology promoters, adhesion promoters, thickeners, smoke suppressants, anti-static agents, anti-microbial agents, fungicides, insecticides, and combinations thereof. If employed, the additive component may be present in various amounts. It is to be appreciated that the additive component may include any combination of the aforementioned additives.

In certain embodiments, the additive component comprises a catalyst component. In one embodiment, the catalyst component comprises a tin catalyst. Suitable tin catalysts, for purposes of the present invention, include tin(II) salts of organic carboxylic acids, e.g. tin(II) acetate, tin(II) octoate, tin(II) ethylhexanoate and tin(II) laurate. In one embodiment, the organometallic catalyst comprises dibutyltin dilaurate, which is a dialkyltin(IV) salt of an organic carboxylic acid. Specific examples of suitable organometallic catalyst, e.g. dibutyltin dilaurates, for purposes of the present invention, are commercially available from Air Products and Chemicals, Inc. of Allentown, Pa., under the trade name DABCO®. The organometallic catalyst can also comprise other dialkyltin (IV) salts of organic carboxylic acids, such as dibutyltin diacetate, dibutyltin maleate and dioctyltin diacetate.

Examples of other suitable catalysts, for purposes of the present invention, include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, for purposes of the present invention, include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trade name POLYCAT®.

Yet further examples of other suitable catalysts, specifically tertiary amine catalysts, for purposes of the present invention, include dimethylaminoethanol, dimethylaminoethoxyethanol, triethylamine, N,N,N',N'-tetramethylethylenediamine, N,N-dimethylaminopropylamine, N,N,N',N',N''-pentamethyldipropylenetriamine, tris(dimethylaminopropyl)amine, N,N-dimethylpiperazine, tetramethylimino-bis(propylene), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N''-pentamethyldiethylenetriamine, 1,2-dimethylimidazole, 3-(dimethylamino) propylimidazole, and combinations thereof. Specific examples of suitable tertiary amine catalysts are commercially available from Air Products and Chemicals, Inc. under the trade name POLYCAT®.

If employed, the catalyst component can be employed in various amounts. It is to be appreciated that the catalyst component may include any combination of the aforementioned catalysts.

(Tom, please confirm) Typically, the isocyanate component and the processing aid are present in the product or composite article in a combined amount of from about 1 to about 25, more typically from about 1 to about 15, yet more typically from about 1 to about 10, and most typically from about 1 to about 5, parts by weight, based on 100 parts by weight of the product or the composite article. By "combined amount", it is meant that each of the isocyanate component and the processing aid are individually present in the product or composite article in a positive amount, i.e., in an amount greater than zero parts by weight based 100 parts by weight of the product or composite article. The isocyanate component and the processing aid can be present in the product or the composite article in various weight ratios. Typically, the isocyanate component and the processing aid are present in a weight ratio of from about 10:1 to about 1:10, more typically from about 5:1 to about 1:5, yet more typically from about 4:1 to about:1:4, and most typically from about 4:1 to about 2:1. Generally, the graft polyol must be present in an effective amount to impart hydrophobicity to the lignocellulosic composite article, as well as other physical properties described herein, such as cold-tack for the product. Typically, the graft polyol is present in the product or composite article in an amount of at least about 0.25, more typically at least about 0.5, and most typically at least about 1, parts by weight, based on 100 parts by weight of the product or composite article. It is to be appreciated that the other optional components, e.g. the auxiliary polyol and/or the additive component, can also be present the product and the composite article.

In certain embodiments, the product and the composite article are substantially free of urea formaldehyde (UF) resin and/or phenol formaldehyde (PF) resin. By "substantially free", it is meant that in these embodiments, the UF resin and/or PF resin is present in an amount no greater than about 15, more typically no greater than about 10, yet more typically no greater than about 5, and most typically approaching or equaling 0, parts by weight, based on 100 parts by weight of the product or the composite article. In other embodiments, the product and the composite article are completely free of UF resin and/or PF resin.

The isocyanate component and the processing aid of the binder composition may be supplied to consumers for use by various means, such as in railcars, tankers, large sized drums and containers or smaller sized drums, totes, and kits. For example, one drum can contain the isocyanate component and another drum can contain the processing aid. Providing the components to consumers separately reduces premature reaction of the components and provides for increased formulation flexibility for forming the binder composition. For example, a consumer can select a specific isocyanate component and a specific processing aid, and amounts thereof, to prepare the product and the composite article formed therefrom. If other components are employed, such as the auxiliary polyol and/or the additive component, e.g. the catalyst component, such components can be provided separately or pre-mixed with one of or both of the isocyanate component and the processing aid.

The composite article, which is formed from the product, may be of various sizes, shapes, and thickness. For example, the composite article of the present invention can be configured to mimic conventional composite articles, such as OSB, PB, scrimber, and MDF beams, boards, or panels. The composite article can also be of various complex shapes, such as moldings, fascias, furniture, etc. As described above, in certain embodiments, the composite article is fiberboard, e.g. MDF. In other embodiments, the composite article is OSB, scrimber, or OSL. In yet other embodiments, the composite article is PB. The composite article can comprise one or more layers. For example, if the composite article is OSB, the composite article can comprise one layer, e.g. a core layer, two layers, e.g. a core layer and a face/fascia layer, or three or more layers, e.g. a core layer and two fascia layers, as understood by those skilled in the art.

In certain embodiments, such as for OSB applications, the composite article has a first fascia layer comprising a first portion of the plurality of lignocellulosic pieces compressed together and substantially oriented in a first direction. The composite article further has a second fascia layer spaced from and parallel to the first fascia layer and comprising a second portion of the plurality of lignocellulosic pieces compressed together and substantially oriented in the first direction. The composite article yet further has a core layer disposed between the first and second fascia layers and comprising a remaining portion of the plurality of lignocellulosic pieces compressed together and substantially oriented in a second direction different than the first direction. In these embodiments, at least one of the portions of the plurality of lignocellulosic pieces is compressed together with the binder composition of present invention, which cures to form the reaction product, as described and exemplified above. For example, the core layer can comprise the reaction product formed from the binder composition. The fascia layers can also include the reaction product formed from the binder composition in addition to, or alternate to, the core layer. The layers can each comprises different reaction products, depending on the specific components employed in the respective binder compositions of the layers. In certain embodiments, at least one of the layers, e.g. one or both of the fascia layers, can further comprise a phenol formaldehyde (PF) resin, as understood in the art. Each of the layers can be of various thicknesses, such as those encountered with conventional OSB layers. Those skilled in the art appreciate that OSL typically has lignocellulosic pieces substantially orientated in only one direction. Other types of composite articles, e.g. wood composites, and their methods of manufacture, that can be formed for purposes of the present invention, e.g. by employing the binder composition, are described by pages 395 through 408 of THE POLYURETHANES HANDBOOK (David Randall & Steve Lee eds., John Wiley & Sons, Ltd. 2002), which is incorporated herein in their entirety.

The composite article has an original thickness, i.e., a thickness after manufacture, e.g. after pressing the product to form the composite article. Typically, due to the reaction product of the present invention, the composite article exhibits a swelling of less than about 10%, more typically less than about 5%, and most typically less than about 3%, based on a 24-hour cold-soak test according to ASTM D1037. The thickness can vary, but is typically of from about 0.25 to about 10, more typically from about 0.25 to about 5, and most typically from about 0.25 to about 1.5, inches. It is to be appreciated that describing thicknesses may not be suitable when describing complex shapes other than boards or panels. As such, the composite article can be of various dimensions based on final configuration of the composite article.

The composite article has an internal bond (IB) strength. Typically, due to the reaction product of the present invention, namely, the processing aid of the binder composition, the IB strength is greater than about 20, more typically greater than about 30, and most typically greater than about 40, pounds per square inch (psi), according to ASTM D1037. In certain embodiments, the composite article typically has an IB strength of from about 50 to about 500, more typically from about 100 to about 300, and most typically from about 150 to about 250, psi, according to ASTM D1037.

As understood to those of ordinary skill in the art, IB strength is a "brittle strength" property. Typically, in conventional composite articles, as IB strength increases, flexural properties such as modulus of elasticity (MOE) and modulus of rupture (MOR) change, specifically, MOE generally decreases as IB strength increases. However, quite surprisingly, with the composite article of the present invention, MOE generally increases as IB strength increases. It is believed that this unexpected relationship is due in part to the reaction product of the present invention, namely, the processing aid of the binder composition.

Typically, the composite article has a MOE greater than 75,000, more typically greater than 95,000, more typically greater than 100,000, and most typically greater than 110,000, psi, according to ASTM D1037. Typically, the composite article has a MOR greater than 3,000, more typically greater than 3,250, yet more typically greater than 3,300, and most typically greater than 3,500, psi, according to ASTM D1037.

The present invention also provides a method of forming an article, which can be the product or the composite article, with the product typically being formed as an intermediate to the formation of the composite article. To form the article, the lignocellulosic pieces are provided. As described and exemplified above, the lignocellulosic pieces can be derived from a variety of lignocellulosic sources, and can be formed from a variety of processes, as understood in the art.

The isocyanate component and the processing aid, and optionally, other components, e.g. the auxiliary polyol and/or the additive component, (all of which are hereinafter referred to as the components) are applied to the plurality of lignocellulosic pieces to form the product of the present invention. The components can be applied to the lignocellulosic pieces at the same time, or can be applied to the lignocellulosic pieces at different times. In one embodiment, the processing aid is applied the lignocellulosic pieces prior to the isocyanate component. In another embodiment, the processing aid is applied to the lignocellulosic pieces after the isocyanate component. In yet another embodiment, the processing aid and the isocyanate component are applied simultaneously to the lignocellulosic pieces. For example, the processing aid can be applied to the lignocellulosic pieces, and then the isocyanate component can be applied to the lignocellulosic pieces at some time later, or vice versa. Alternatively, the components can be applied at the same time, either separately, and/or premixed. In one embodiment, the components are blended to form a mixture, such that the mixture is applied to the lignocellulosic pieces. The components can be applied to the lignocellulosic pieces by various methods, such as by mixing, tumbling, rolling, spraying, sheeting, blow-line resination, blending (e.g. blow-line blending), etc. For example, the components and the lignocellulosic pieces can be mixed or milled together during the foiniation of a mass, also referred to as a binder-lignocellulosic mixture, mat, or "furnish", as further described below. As described above, the isocyanate component and the processing aid are reactive with one another, such that they begin to react with one another upon contact under reaction conditions.

Typically, the components are applied to the lignocellulosic pieces by a spraying, an atomizing or a fogging process, as understood in the art. The mass can then be formed into the product, such as by dropping the mass onto a carrier, e.g. a conveyor belt, or, alternatively, the product can be formed directly on the carrier, i.e., the binder-lignocellulosic mixture is formed directly on the carrier. In other words, the plurality of lignocellulosic pieces having the isocyanate component and the processing aid applied thereon are arranged on the carrier to form the mass. After arrangement, the mass has a predetermined width and a predetermined thickness with the plurality of lignocellulosic pieces loosely oriented on the carrier. The predetermined width and thickness of the mass are determined according to final widths and thicknesses desired for the composition article, as described further below.

As described above, the product can then be formed in various shapes, such as boards or panels, or formed into more complex shapes, as described and exemplified above, such as by molding or extruding the product to form the composite article.

In certain embodiments, the components are sprayed, atomized, and/or fogged onto the lignocellulosic pieces while the lignocellulosic pieces are being agitated in suitable equipment. Spraying, atomizing and fogging can occur via use of nozzles, such as one nozzle for each component supplied thereto, or nozzles that have two or more components premixed and supplied thereto. Generally, at least one nozzle applies the isocyanate component, and at least one nozzle applies the processing aid. To maximize coverage of the lignocellulosic pieces, the components are generally applied by spraying droplets or atomizing or fogging particles of the components onto the lignocellulosic pieces as the lignocellulosic pieces are being tumbled in a rotary blender or similar apparatus. As another example, the lignocellulosic pieces can be coated with the components in a rotary drum blender equipped with at least one, typically at least two spinning disk atomizers. Tumblers, drums, or rollers including baffles can also be used, as understood in the art. As introduced above, alternatively, the lignocellulosic pieces can be provided directly to the carrier, and the components can be applied to the lignocellulosic pieces, e.g. by spraying or sheeting, to form the product. For example, the lignocellulosic pieces can be disposed on a conveyor belt or a plate, and then sprayed with the components to form the product. Further, at least one of the components, e.g. the processing aid, can already be present on the lignocellulosic pieces, such that the remaining component(s) of the binder composition, e.g. the isocyanate component, can then be applied to the lignocellulosic pieces and to the processing aid.

The amount of the components to be applied and mixed with the lignocellulosic pieces is dependant upon several variables including, the specific components employed, the size, moisture content and type of lignocellulosic pieces used, the intended use of the composite article, and the desired properties of the composite article. The binder-lignocellulosic mixture produced as described above, is referred to in the art as a "furnish". The resulting furnish (i.e., the product), is typically formed into a single or multi-layered mat that is compressed into, for example, OSB, PB, scrimber, MDF, or another composite article of the desired shape and dimensions. As described above, the product can also be formed into more complex shapes, such as by molding or extruding the furnish.

The mat can be formed in any suitable manner. For example, the furnish can be deposited on a plate-like carriage carried on an endless belt or conveyor from one or more hoppers spaced above the belt. When a multi-layer mat is formed, a plurality of hoppers are used with each having a dispensing or forming head extending across the width of the carriage for successively depositing a separate layer of the furnish as the carriage is moved between the forming heads. The mat thickness (i.e., predetermined thickness) will vary depending upon such factors as the size and shape of the lignocellulosic pieces, the particular technique used in forming the mat, the desired thickness and density of the final composite article and the pressure used during the press cycle. The predetermined thickness of the mat (the product) is usually about 5 times to about 20 times a final thickness of the composite article. For example, for flakeboard or particleboard panels of 0.5 inch thickness and a final density of about 35 lbs/ft$^3$, the mat usually will originally be about 3 inches to about 6 inches thick. The predetermined width of the mat is usually substantially the same as a final width of the composite article; however, depending on configuration of the composite article, the final width may be a fraction of the predetermined thickness, similar to description of the predetermined thickness.

As alluded to above, the lignocellulosic pieces are loosely oriented in the product, e.g. the mat. As described above, a carrier is provided, such as a conveyor belt or plate, and the product is disposed on the carrier. As also described above, the product can either be formed directly on the carrier, and/or transferred to the carrier, after forming, e.g. in a tumbler. The processing aid substantially maintains orientation of the plurality of lignocellulosic pieces in the product. In other words, the processing aid serves as a "tacktifier" or as "sticky" glue, and can be used as a substitute for UF and/or PF resins. As such, the binder composition has cold-tack. As understood by those of ordinary skill in the art, cold-tack can be determined in a variety of ways. For example, one can use a "slump" test, which employs a funnel packed full of the mass, the funnel is then tipped onto a surface and removed, such that the mass (in the shape of the funnel) remains on the surface. The funnel shaped mass can then be observed for changes in shape over time, such as changes in angle due to slumping/collapsing of the funnel shaped mass. Another example is referred to in the art as a "snowball" test, where one can grab a handful of the mass, make a ball of the mass in hand, and toss the ball up and down to determine if the ball falls apart. Other suitable tests, for purposes of the present invention, are described in ASTM D1037. Specifically, the processing aid substantially maintains the predetermined width and the thickness of the mass, e.g. the product, while the product is on the carrier. As can be appreciated, when the carrier moves, such as by conveying, the processing aid keeps the product, e.g. a mat, from falling apart due to vibrations. Vibrations can also occur, for example, if the carrier is a plate, and the plate is being moved to a press. Such vibrations can cause orientation problems with the lignocellulosic pieces, can cause reduced internal bond (IB) strength, and can cause other similar issues.

The composite article is typically formed from the product, e.g. the mat, by compressing the mass at an elevated temperature and under pressure. Such conditions facilitate reaction of the binder composition to form the reaction product. By serving as a tacktifier, the processing aid can reduce movement of the lignocellulosic pieces in the mass, such as by reducing a chance that the lignocellulosic pieces will blow apart when applying pressure to the mass. Specifically, speed of applying pressure to the mass to form the composite article can be increased relative to conventional pressing speed and/or pressures employed to form conventional composite articles, which provides economic benefits, such as increased throughput, for manufacturers of the composite article of the present invention.

Typically, heat is applied to the mass to facilitate cure of the binder composition. Press temperatures, pressures and times vary widely depending upon the shape, thickness and the desired density of the composite article, the size and type of wood flakes, the moisture content of the wood flakes, and the specific components employed. The press temperature, for example, can range from about 100° C. to about 300° C. To minimize generation of internal steam and the reduction of the moisture content of the final composite article below a desired level, the press temperature is typically less than about 250° C. and most typically from about 180° C. to about 240° C. The pressure employed is generally from about 300 to about 800 pounds per square inch (psi). Typically, the press time is from 120 to 900 seconds. The press time employed should be of sufficient duration to at least substantially cure the binder composition (in order to substantially form the reaction product) and to provide a composite article of the desired shape, dimension and strength. For the manufacture of, e.g. flakeboard or PB panels, the press time depends primarily upon the panel thickness of the composite article produced. For example, the press time is generally from about 200 seconds to about 300 seconds for a pressed composite article with about a 0.5 inch thickness.

Other suitable methods, for forming the composite article of the present invention, are described in the U.S. Pat. Nos. 6,451,101 to Mente et al.; 6,458,238 to Mente et al.; 6,464,820 to Mente et al.; 6,638,459 to Mente et al.; 6,649,098 to Mente et al., and U.S. Pat. No. 6,344,165 to Coleman; and U.S. Publication Nos. 2003/0047278 to Mente et al.; 2005/0221078 to Lu et al.; and 2005/0242459 to Savino et al., which were introduced above.

The present invention yet further provides a method of imparting hydrophobicity to the lignocellulosic pieces. The method comprises the step of applying the processing aid to the lignocellulosic pieces, as described and exemplified above. By imparting hydrophobicity, the composite articles are less apt to swell when exposed to moisture, as described above.

The following examples, illustrating the lignocellulosic products and lignocellulosic composite articles of the present invention, are intended to illustrate and not to limit the invention.

EXAMPLES

Examples of lignocellulosic composite articles are prepared, specifically 1 comparative example (Comparative) and three inventive examples (Inventive 1 through 3) are prepared. The lignocellulosic composite articles formed hereinafter are particleboards. The examples are made using typical production methods for manufacturing particleboard (PB), such that methods of manufacture do not impart differences between the examples. The amount and type of each component used to form lignocellulosic products are indicated in Table I below with all values in parts by weight based on 100 parts by weight of all of the components.

TABLE I

| Component | Comparative | Inventive 1 | Inventive 2 | Inventive 3 |
|---|---|---|---|---|
| Isocyanate Component | 4 | 4 | 4 | 4 |
| Processing Aid 1 | 0 | 1 | 1 | 0 |
| Processing Aid 2 | 0 | 0 | 0 | 1 |
| IB Strength (psi) | 156 | 208 | 166 | 221 |
| MOE (psi) | 950934 | 1165299 | 1102877 | 1179375 |
| MOR (psi) | 3049 | 3958 | 3357 | 3927 |
| Density (lbs/ft$^3$) | 47.24 | 46.83 | 47.38 | 47.12 |

Isocyanate Component is a polymeric MDI with a functionality of about 2.7, an NCO content of about 31.5 wt. %, and a viscosity of about 200 cps at 25° C., commercially available from BASF Corporation of Florham Park, N.J.

Processing Aid 1 is a secondary hydroxyl-terminated graft polyether triol having about 44 wt. % of polymeric particles comprising copolymerized styrene and acrylonitrile, a hydroxyl number of from about 27 to about 31 mg KOH/gm, and a viscosity of about 4,230 cps at 25° C., commercially available from BASF Corporation.

Processing Aid 2 is a secondary hydroxyl-terminated graft polyether triol having about 44 to about 45 wt. % of polymeric particles comprising copolymerized styrene and acrylonitrile, and having a molecular weight of about 730.

The remaining parts by weight of the examples comprise lignocellulosic pieces of shape and size typically used to form PB, specifically, the lignocellulosic pieces comprise pine having a dry weight content of about 88% and a moisture content of about 7%, by weight, passed on 100 parts by weight of the lignocellulosic pieces.

For Inventive 1, the Isocyanate Component and Processing Aid 1 are added separately to the lignocellulosic pieces to form a lignocellulosic product, the Processing Aid 1 being added to the lignocellulosic pieces prior to the Isocyanate Component. For Inventive 2, the Isocyanate Component and Processing Aid 1 are pre-mixed to form a blend, and the blend is added to the lignocellulosic pieces to form a lignocellulosic product. Inventive 3 is prepared the same as Inventive 1, but with a different processing aid having a lower molecular weight relative to Processing Aid 1. After the lignocellulosic products, e.g. mats, are formed, the mats are compressed using a standard PB forming apparatus under typical temperature and pressure conditions used in the art to form PB for a matter of time, thereby forming the lignocellulosic composite articles. After the lignocellulosic composite articles are formed, physical testing is performed, employing standard test methods understood by those of ordinary skill in the art.

As illustrated above in Table I, all of the inventive examples have better physical properties (e.g. IB Strength, MOE, and MOR) relative to the comparative example. As also shown in with the inventive examples, surprisingly, MOE increases for the inventive examples as IB strength also increases. Further, it is believed that adding the processing aid (as a separate stream) to the lignocellulosic pieces prior to the isocyanate being added (as a separate stream) to the lignocellulosic pieces is useful for increasing physical properties of the lignocellulosic composite articles, as shown by the increased IB strength, MOE, and MOR of Inventive 1 relative to Inventive 2. In other words, it is believed that desirable physical properties of the lignocellulosic composite articles can be achieved by separately adding the processing aid and the isocyanate component to the lignocellulosic pieces, preferably by applying the processing aid prior to the isocyanate component. If the components are blended together to form a mixture, it is believed that such mixing should occur in a short time period (e.g. seconds) before application of the mixture to the lignocellulosic pieces, to prevent the components from "over" reacting with each other prior to introduction of the mixture to the lignocellulosic pieces. It is also believed that employing graft polyols of lower molecular weight provide similar advantages, as appreciated by the increased IB strength, MOE, and MOR of Inventive 3 relative to Inventives 1 and 2. It is to be appreciated that various weight ratios of the isocyanate component, as described and exemplified above, and the processing aid, as described and exemplified above, can be used for purposes of the present invention.

The present invention has been described herein in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims.

What is claimed is:

1. A lignocellulosic product comprising:
   a plurality of lignocellulosic pieces;
   an isocyanate component disposed on said plurality of lignocellulosic pieces; and
   a processing aid disposed on said plurality of lignocellulosic pieces and comprising a polymer polyol having
      a continuous phase comprising an isocyanate-reactive component, and
      a discontinuous phase comprising polymeric particles;
   said isocyanate component and said processing aid present in said lignocellulosic product in a combined amount of from about 1 to about 25 parts by weight based on 100 parts by weight of said lignocellulosic product, and
   wherein said lignocellulosic product is an oriented strand board (OSB) product, an oriented strand lumber (OSL) product, a particleboard (PB) product, or a scrimber product; or wherein said lignocellulosic product is a fiberboard product.

2. A lignocellulosic product as set forth in claim 1 substantially free of a wax component.

3. A lignocellulosic product as set forth in claim 1 wherein said polymeric particles are present in said processing aid in an amount of from about 5 to about 70 parts by weight based on 100 parts by weight of said processing aid.

4. A lignocellulosic product as set forth in claim 3 wherein said polymeric particles comprise styrene acrylonitrile (SAN) copolymers.

5. A lignocellulosic product as set forth in claim 1 wherein said isocyanate component is selected from the group of polymeric diphenylmethane diisocyanates (PMDI), diphenylmethane diisocyanates (MDI), and combinations thereof.

6. A lignocellulosic product as set forth in claim 1 wherein said continuous phase comprises a hydrophobic polyol.

7. A lignocellulosic product as set forth in claim 1 wherein said plurality of lignocellulosic pieces are present in an amount of from about 75 to about 99 parts by weight based on 100 parts by weight of said lignocellulosic product.

8. A lignocellulosic product as set forth in claim 7 wherein said isocyanate component and said processing aid are present in said lignocellulosic product in a combined amount of from about 1 to about 15 parts by weight based on 100 parts by weight of said lignocellulosic product.

9. A lignocellulosic composite article comprising:
a plurality of lignocellulosic pieces present in an amount of from about 75 to about 99 parts by weight based on 100 parts by weight of said lignocellulosic composite article; and
the reaction product of an isocyanate component and a processing aid, said reaction product bonding said plurality of lignocellulosic pieces together and present in said lignocellulosic composite article in an amount of from about 1 to about 25 parts by weight based on 100 parts by weight of said lignocellulosic composite article;
wherein said processing aid comprises a polymer polyol and wherein said lignocellulosic composite article is oriented strand board (OSB), oriented strand lumber (OSL), particleboard (PB), or scrimber; or wherein said lignocellulosic composite article is fiberboard.

10. A lignocellulosic composite article as set forth in claim 9 substantially free of a wax component.

11. A lignocellulosic composite article as set forth in claim 9 wherein said polymer polyol has a continuous phase comprising a polyol and a discontinuous phase comprising polymeric particles that are present in said processing aid in an amount of from about 5 to about 70 parts by weight based on 100 parts by weight of said processing aid.

12. A lignocellulosic composite article as set forth in claim 11 wherein said polymeric particles comprise styrene acrylonitrile (SAN) copolymers.

13. A lignocellulosic composite article as set forth in claim 11 wherein said polyol of said isocyanate-reactive component is a hydrophobic polyol.

14. A lignocellulosic composite article as set forth in claim 9 exhibiting a swelling of less than about 10% in a 24-hour cold-soak test according to ASTM D1037.

15. A lignocellulosic composite article as set forth in claim 9 having an internal bond (TB) strength greater than about 100 psi according to ASTM D1037.

16. A lignocellulosic composite article as set forth in claim 9 wherein said reaction product is present in said lignocellulosic composite article in an amount of from about 1 to about 15 parts by weight based on 100 parts by weight of said lignocellulosic composite article.

17. A method of forming an article comprising the steps of:
providing a plurality of lignocellulosic pieces;
applying an isocyanate component and a processing aid to the plurality of lignocellulosic pieces;
arranging the plurality of lignocellulosic pieces having the isocyanate component and the processing aid applied thereon on a carrier to form a mass having a predetermined width and a predetermined thickness with the plurality of lignocellulosic pieces loosely oriented on the carrier, the processing aid comprising a polymer polyol having
a continuous phase comprising an isocyanate-reactive component, and
a discontinuous phase comprising polymeric particles; and
reacting the isocyanate component and the processing aid;
wherein the processing aid substantially maintains the orientation of the plurality of lignocellulosic pieces in the mass thereby substantially maintaining the predetermined width and predetermined thickness of the mass while on the carrier;
wherein the article is oriented strand board (OSB), oriented strand lumber (OSL), particleboard (PB), or scrimber; or wherein the article is fiberboard.

18. A method as set forth in claim 17 wherein the processing aid is applied to the plurality of lignocellulosic pieces prior to applying the isocyanate component to the plurality of lignocellulosic pieces.

19. A method as set forth in claim 17 wherein the isocyanate component is applied to the plurality of lignocellulosic pieces prior to applying the processing aid to the plurality of lignocellulosic pieces.

20. A method as set forth in claim 17 wherein the isocyanate component and the processing aid are applied simultaneously to the plurality of lignocellulosic pieces.

21. A method as set forth in claim 17 further comprising the step of applying pressure and/or heat to the mass for an amount of time sufficient to form a lignocellulosic composite article.

22. A lignocellulosic product as set forth in claim 1 wherein said isocyanate component and said processing aid are separately disposed on said lignocellulosic pieces.

23. A lignocellulosic product as set forth in claim 1 wherein said isocyanate component has a viscosity of from about 100 to about 5,000 cps at 25° C. and said processing aid has a viscosity of from about 100 to about 10,000 cps at 25° C., both according to ASTM D2196.

24. A lignocellulosic product as set forth in claim 1 wherein said polymer polyol has a molecular weight of from about 400 to about 20,000.

25. A lignocellulosic composite article as set forth in claim 9 wherein said lignocellulosic composite article is OSB and said lignocellulosic pieces comprise strands having an average length of from about 2.5 to about 6 inches, an average width of from about 0.5 to about 2 inches, and an average thickness of from about 0.1 to about 0.5 inches; or wherein said lignocellulosic composite article is OSL and said lignocellulosic pieces comprise strands about 1.5 inches wide and about 12 inches long or strands about 0.12 inches wide and about 9.8 inches long; or wherein said lignocellulosic composite article is scrimber and said lignocellulosic pieces have average diameters ranging from about 0.25 to about 20 mm.

* * * * *

UNITED STATES PATENT AND TRADEMARK OFFICE
CERTIFICATE OF CORRECTION

| | | Page 1 of 1 |
|---|---|---|
| PATENT NO. | : 8,486,523 B2 | |
| APPLICATION NO. | : 13/055825 | |
| DATED | : July 16, 2013 | |
| INVENTOR(S) | : Donald Charles Mente | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 256 days.

Signed and Sealed this
Twenty-seventh Day of January, 2015

Michelle K. Lee
*Deputy Director of the United States Patent and Trademark Office*